United States Patent
Yoshizawa et al.

(10) Patent No.: US 7,816,823 B2
(45) Date of Patent: Oct. 19, 2010

(54) COOLING DEVICE OF ELECTRIC MOTOR FOR VEHICLE

(75) Inventors: Hideyuki Yoshizawa, Tokyo (JP); Kazushi Horie, Tokyo (JP); Tadashi Maeda, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 298 days.

(21) Appl. No.: 12/065,040

(22) PCT Filed: Apr. 14, 2006

(86) PCT No.: PCT/JP2006/307951

§ 371 (c)(1),
(2), (4) Date: Mar. 11, 2008

(87) PCT Pub. No.: WO2007/026445

PCT Pub. Date: Mar. 8, 2007

(65) Prior Publication Data
US 2009/0146512 A1    Jun. 11, 2009

(30) Foreign Application Priority Data
Aug. 31, 2005    (JP) .............................. 2005-250391

(51) Int. Cl.
H02K 9/02    (2006.01)
(52) U.S. Cl. ....................................................... 310/53
(58) Field of Classification Search ..................... 310/53
See application file for complete search history.

(56) References Cited

U.S. PATENT DOCUMENTS 4,698,535 A * 10/1987 Shiraki et al. .......... 310/156.37
6,065,483 A *  5/2000 Tanaka et al. ............... 251/366
6,541,881 B1 *  4/2003 Turner ......................... 310/36

FOREIGN PATENT DOCUMENTS

| JP | 5-236690 (A) | 9/1993 |
| JP | 7-250454 (A) | 9/1995 |
| JP | 7-332178 (A) | 12/1995 |
| JP | 8-200541 (A) | 8/1996 |
| JP | 09-331649 | 12/1997 |
| JP | 2001-045711 (A) | 2/2001 |
| JP | 2002-233104 (A) | 8/2002 |

OTHER PUBLICATIONS

Form PCT/ISA/210 (International Search Report) dated Jul. 18, 2006.

* cited by examiner

*Primary Examiner*—Quyen Leung
*Assistant Examiner*—Naishadh N Desai
(74) *Attorney, Agent, or Firm*—Buchanan Ingersoll & Rooney PC

(57) ABSTRACT

A cooling device of an electric motor for a vehicle for receiving cooling air into the electric motor through a suction port according to the rotation of a rotor shaft on which a rotor core, which is disposed opposite to a stator core, is installed. The cooling device includes an air volume regulating mechanism regulating a cooling air volume received therein through the suction port according to an ambient temperature. Since the cooling air volume received in the cooling device through the suction port is regulated according to the ambient temperature, the cooling of the electric motor can be optimized, and noise generated can be efficiently reduced according to the ambient temperature.

5 Claims, 7 Drawing Sheets

COOLING DEVICE OF ELECTRIC MOTOR FOR VEHICLE

TECHNICAL FIELD

The present invention relates to a cooling device of an electric motor for a vehicle, in particular, to a cooling construction of an induction motor for a vehicle, and relates to a structure that can prevents snow and rain from entering along with cooling air at the time of an operation and can reduce noises at the time of the operation.

BACKGROUND ART

In an induction motor for a vehicle, at the time of the operation the temperatures of parts of the motor are raised by a copper loss caused by current flowing through a stator coil and a rotor conductor and an iron loss developed in a stator core and a rotor core by a rotating magnetic field. For this reason, there has been conventionally used a structure in which cooling air is forcibly taken into the motor from the outside by a fan fixed to a rotary shaft to cool the interior of the frame of the motor (see, for example, patent document 1).

When a self-cooled induction motor as described above is used in a heavy snowfall area, cooling air to the motor is sucked in proportion to the number of revolutions of the motor even at the time of startup and at the time of low load and hence snow and water droplets are brought into the motor together with the cooling air, thereby bringing about a state in which the snow and the water droplets prevent the revolution of the motor and are again frozen to cause damage to the insulating surface and parts of the motor after the motor is stopped.

When the self-cooled induction motor as described above is used, a plurality of rotor conductors cut through wind to develop a sound. For example, when the number of rotor conductors is forty six and the rotor rotates at a rotational speed of 3000 rpm, the rotor conductors cut through the wind to steadily develop a sound of a frequency of 2300 Hz (=50× 46) and a fan cuts through the wind to develop a sound similarly to diffuse the sounds to the outside, so the induction motor develops a very large harsh sound.

[Patent document 1] JP-A-2001-45711

DISCLOSURE OF THE INVENTION

Problems that the Invention is to Solve

The object of this invention is to produce a cooling device of an electric motor for a vehicle that regulates a cooling air quantity taken into through an intake port according to an ambient temperature to optimize the cooling of the electric motor and to efficiently decrease the occurrence of noise according to the ambient temperature.

Means for Solving the Problems

A cooling device of an electric motor for a vehicle according to this invention is a cooling device of an electric motor for a vehicle of the type in which cooling air is taken into the electric motor through an intake port according to turn of a rotor shaft to which a rotor core disposed opposite to a stator core is fixed, characterized by including an air volume regulating mechanism for regulating a cooling air volume taken into through the intake port according to an ambient temperature.

ADVANTAGE OF THE INVENTION

According to this invention, it is possible to produce a cooling device of an electric motor for a vehicle that regulates a cooling air quantity taken into the electric motor through an intake port according to an ambient temperature optimize the cooling of the electric motor and can efficiently decrease the occurrence of noise according to the ambient temperature.

BEST MODE FOR CARRYING OUT THE INVENTION

Embodiment 1

Choke Type Air Volume Regulating Mechanism

An embodiment 1 in accordance with this invention will be described with reference to FIG. 1 to FIG. 3. FIG. 1 is a longitudinal sectional view showing an entire construction in the embodiment 1. FIG. 2 is a perspective view showing the construction of an air volume regulating mechanism in the embodiment 1. FIG. 3 is a perspective view partially in cross section of the construction of the air volume regulating mechanism in the embodiment 1.

In FIG. 1 showing the entire construction in the embodiment 1 according to this invention, a stator core 1 constructing a main electric motor MA for a vehicle has a stator coil 3 wound and held around a slot. This stator core 1 is secured to a cylindrical frame 6.

A rotor core 2 disposed with a predetermined gap 11 with respect to the inside of the stator core 1 and having a rotor conductor 9 is secured to a rotor shaft 4 supported by a bearing 5, which is held by an anti-driving side bracket 14 secured to a frame 16, and a bearing 15, which is held by a driving side bracket 8 secured to a frame 17. This rotor shaft 4 has a fan 10 secured thereto.

The main electric motor MA for a vehicle has an intake port 7 formed in the anti-driving side bracket 14 holding the bearing 5 and an exhaust port 13 formed in the driving side bracket 8.

Next, an operation will be described. In the main electric motor MA for a vehicle constructed in the above-mentioned manner, when an alternating electric power is applied to the stator coil 3, a rotating magnetic field is produced in the stator core 1 and an electric current is induced in the rotor conductor 9 by this rotating magnetic field. Torque is produced on the rotor core 2 by this induced current and the rotating magnetic field to rotate the rotor shaft 4 to thereby drive the wheels of the vehicle. While the main electric motor is operated, temperatures in the respective parts of the main electric motor MA for a vehicle are raised by a copper loss caused by the current passing through the stator core 3 and the rotor conductor 9 and an iron loss caused in the stator core 1 and the rotor core 2 by the rotating magnetic field. However, when the fan 10 secured to the rotor shaft 4 is rotated, air around the fan 10 is blown out of the exhaust port 13 by a centrifugal force and cooling air is introduced through a cooling air introduction port 7 by a negative pressure produced by this blown air and is passed through an air port 12 formed in the rotor core 2 and the gap 11 between the stator core 1 and the rotor core 2 to cool the respective parts to a temperature below a heat-resistant limit temperature. Arrows shown in the drawing designate directions in which the cooling air flows.

In FIG. 2 and FIG. 3 showing the construction of an air volume regulating mechanism WM in the embodiment 1, this air volume regulating mechanism WM is constructed of a choke type air volume regulating mechanism and is secured to the intake port 7 (see FIG. 1) of the main electric motor MA for a vehicle.

A partition plate 22 secured to a rotary shaft 23 supported by bearings 24 and rotated by a driving force produced by a bimetal 25 varies an opening area of an air channel formed by a cylindrical wind channel 7a constructing the intake port 7 with respect to cooling air flowing through the air channel formed by the wind channel 7a to thereby vary a cooling air volume taken into through the intake port 7.

In this regard, the rotating range of the partition plate 22 is regulated by stoppers 26.

The partition plate 22 is constructed of a circular disk having a circular area corresponding to the sectional area of the air channel formed by the wind channel 7a and is secured to the rotary shaft 23 supported by the bearings 24 so as to turn in such a way that the arrangement angle of the partition plate 22 can be varied to the cooling air flowing through the air channel formed by the wind channel 7a.

The volume of the cooling air flowing through the air channel formed by the wind channel 7a can be regulated by varying the arrangement angle of the partition plate 22. When a direction in which the partition plate 22 extends is made vertical to a direction in which the cooling air flows, the cooling air volume becomes zero, whereas when the direction in which the partition plate 22 extends is made to coincide with the direction in which the cooling air flows, the cooling air volume becomes maximal. The cooling air volume can be regulated by varying the arrangement angle of the partition plate 22 at its intermediate position.

The bimetal 25 is deformed according to an ambient temperature in the surroundings where the main electric motor MA for a vehicle is disposed to drive the partition plate 22 to turn the partition plate 22 around the rotary shaft 23 to vary the arrangement angle of the partition plate 22, thereby constructing an air regulating mechanism for regulating a cooling air volume.

When the ambient temperature rises, the bimetal 25 turns the partition plate 22 toward a direction in which the direction in which the partition plate 22 extends coincides with the direction in which the cooling air flows through the air channel formed by the wind channel 7a. On the other hand, the ambient temperature falls, the bimetal 25 turns the partition plate 22 toward a direction in which the direction in which the partition plate 22 extends coincides with a plane vertical to the direction in which the cooling air flows through the air channel formed by the wind channel 7a.

A pair of stoppers 26 are disposed opposite to the peripheral edge portion of the circular disk-shaped partition plate 22, whereby the turning of the partition plate 22 is regulated within a specified range. In other words, there neither occurs a case where the direction in which the partition plate 22 extends completely coincides with the direction in which the cooling air flows through the air channel formed by the wind channel 7a to fully open the air channel formed by the wind channel 7a, nor a case where the direction in which the partition plate 22 extends completely coincides with a plane vertical to the direction in which the cooling air flows through the air channel formed by the wind channel 7a to close the air channel formed by the wind channel 7a.

According to the embodiment 1 in accordance with this invention, in the cooling device of the electric motor for a vehicle for taking the cooling air into the main electric motor MA for a vehicle through the intake port 7 according to the rotation of the rotor shaft 4 to which the rotor core 2 disposed opposite to the stator core 1 is secured, there is provided the air volume regulating mechanism having a partition member made of the partition plate 22 and the bimetal 25, the partition plate 22 being capable of varying its arrangement angle with respect to the direction in which the cooling air taken into through the intake port 7 flows, the bimetal 25 being deformed by the ambient temperature to drive the partition member made of the partition plate 22 to vary the opening area of the wind channel 7a constructing the intake port 7 to thereby regulate the cooling air volume taken into through the intake port 7. Thus, it is possible to acquire the cooling device of the electric motor for a vehicle that can vary the arrangement angle of the partition member with respect to the direction in which the cooling air flows by the air volume regulating mechanism to regulate the cooling air volume taken into through the intake port according to the ambient temperature, thereby being able to efficiently reduce the load of the electric motor and the occurrence of noises according to the ambient temperature.

Embodiment 2

Sliding Type Air Volume Regulating Mechanism

An embodiment 2 in accordance with this invention will be described with reference to FIG. 4 and FIG. 5. FIG. 4 is a perspective view showing the construction of an air volume regulating mechanism in the embodiment 2. FIG. 5 is a perspective view partially in cross section of the construction of the air volume regulating mechanism in the embodiment 2.

In this embodiment 2, a construction other than a special construction to be described below has the same construction as the construction in the embodiment 1 described above and produces the same effect. In the drawings, the same reference symbols denote the same or corresponding parts.

In FIG. 4 and FIG. 5 showing the construction of the air volume regulating mechanism WM in the embodiment 2 in accordance with this invention, this air volume regulating mechanism WM regulates an air volume by a sliding type regulating mechanism and is secured to the intake port 7 (see FIG. 1) of the main electric motor MA for a vehicle just as with the mechanism in the embodiment 1.

A partition plate 42 is moved by the driving force of a bimetal 43 in a direction perpendicular to the cooling air flowing through an air channel in a wind channel 7b constructing the intake port 7 to regulate the degree of opening/closing of the air channel. With this, the opening area of the cooling air flowing through the air channel in the wind channel 7b constructing the intake port 7 is varied to regulate the cooling air volume.

Here, there is provided the rectangular cylindrical wind channel 7b. A rectangular partition plate 42 extends in a direction perpendicular to the direction in which the cooling air flows through the air channel in the wind channel 7b and has its edge portion fitted in a groove 44 formed on the inner peripheral surface and the top surface of the wind channel 7b. The rectangular partition plate 42 is disposed so as to be able to move in a direction perpendicular to the direction in which the cooling air flows through the air channel in the wind channel 7b along the direction in which the partition plate 42 extends, that is, in the vertical direction as shown in the drawing.

When the ambient temperature rises, the bimetal 43 is deformed to drive the partition plate 42 upward in the drawing to increase an opening area in the air channel in the wind channel 7b. When the ambient temperature falls, the bimetal 43 is deformed to drive the partition plate 42 downward in the drawing to narrow the opening area in the air channel in the wind channel 7b. In this manner, the volume of cooling air flowing through the air channel in the wind channel 7b can be regulated.

According to the embodiment 2 in accordance with this invention, in the cooling device of the electric motor for a vehicle for taking the cooling air into the main electric motor MA for a vehicle through the intake port 7 according to the rotation of the rotor shaft 4 to which the rotor core 2 disposed opposite to the stator core 1 is secured, there is provided a plate-shaped closing member made of the partition plate 42, which is disposed so as to be able to move in the direction of its extension and opens or closes the intake port 7, and there is provided the air volume regulating mechanism WM that is deformed by the ambient temperature to move the plate-shaped closing member made of the partition plate 42 in the direction of its extension to vary the opening area of the wind channel 7b constructing the intake port 7 to thereby regulate the cooling air volume taken into through the intake port 7. Thus, it is possible to acquire the cooling device of the electric motor for a vehicle that can vary the position to which the plate-shaped closing member is moved in the direction of its extension by the air volume regulating mechanism WM to regulate the cooling air volume taken into through the intake port 7 according to the ambient temperature, thereby being able to efficiently reduce the load of the electric motor and the occurrence of noises according to the ambient temperature.

Embodiment 3

Blind Type Air Volume Regulating Mechanism

An embodiment 3 in accordance with this invention will be described with reference to FIG. 6 to FIG. 8. FIG. 6 is a perspective view showing the construction, when viewed from the front side, of an air volume regulating mechanism in the embodiment 3. FIG. 7 is a perspective view showing the construction, when viewed from the rear side, of the air volume regulating mechanism in the embodiment 3. FIG. 8 is a perspective view partially in cross section of the construction of the air volume regulating mechanism in the embodiment 3.

In this embodiment 3, construction other than special construction to be described below has the same construction as the construction in the embodiment 1 described above and produces the same effect. In the drawings, the same reference symbols denote the same or corresponding parts.

In FIG. 6 to FIG. 8 showing the construction of the air volume regulating mechanism WM in the embodiment 3 in accordance with this invention, this air volume regulating mechanism WM regulates a cooling air volume by a blind type regulating mechanism and is secured to the intake port 7 (see FIG. 1) of the main electric motor MA for a vehicle just as with the mechanisms in the embodiment 1 and the embodiment 2.

A driving force produced by a bimetal 66 is transmitted to a rotary shaft 63 supported by a bearing 65 to make a partition plate 62 rotating around this rotary shaft 63 regulate an opening area in the air channel in the wind channel 7c, whereby the volume of the cooling air flowing through the air channel in the wind channel 7c constructing the intake port 7 is regulated.

In this regard, the partition plate 62 is constructed so as to be able to move by the stopper 64 and the bimetal 66 within a range from a state where the partition plate 62 is nearly horizontal to a state where the partition plate 62 abuts against the stopper 64.

When the ambient temperature rises, the bimetals 66 are deformed to drive the plural partition plates 62, which are constructed by a blind type, around the rotary shafts 63 respectively to expand the opening area in the air channel in the wind channel 7b. When the ambient temperature falls, the bimetals 66 are deformed to drive the partition plates 24 around the rotary shafts 63 respectively in a direction opposite to a direction in which the partition plates 62 are driven when the ambient temperature rises to thereby narrow the opening area in the air channel in the wind channel 7b. In this manner, the volume of the cooling air flowing through the air channel in the wind channel 7b can be regulated.

According to the embodiment 3 in accordance with this invention, in the cooling device of the electric motor for a vehicle for taking the cooling air into the main electric motor MA for a vehicle through the intake port 7 (see FIG. 1) according to the rotation of the rotor shaft 4 to which the rotor core 2 disposed opposite to the stator core 1 is secured, there are provided plate-shaped closing members made of the plural partition plates 62 capable of varying their arrangement angles with respect to the direction of flow of the cooling air taken into through the wind channel 7c constructing the intake port 7, the plate-shaped closing members made of the plural partition plates 62 being disposed in parallel to the air channel in the wind channel 7c constructing the intake port 7, and there is provided the air volume regulating mechanism WM that is deformed by the ambient temperature to move the plate-shaped closing members made of the plural partition plates 62 to vary the opening area of the wind channel 7c constructing the intake port 7 to thereby regulate the cooling air volume taken into through the intake port 7. Thus, it is possible to acquire the cooling device of the electric motor for a vehicle that can vary the arrangement angle of the plural plate-shaped closing members with respect to the direction of flow of the cooling air by the air volume regulating mechanism WM to regulate the cooling air volume taken into through the intake port 7 according to the ambient temperature, thereby being able to efficiently reduce the load of the electric motor and the occurrence of noises according to the ambient temperature.

Embodiment 4

Bending Type Air Volume Regulating Mechanism

An embodiment 4 in accordance with this invention will be described with reference to FIG. 9 and FIG. 10. FIG. 9 is a perspective view showing the construction of an air volume regulating mechanism in the embodiment 4. FIG. 10 is a perspective view partially in cross section of the construction of the air volume regulating mechanism in the embodiment 4.

In this embodiment 4, construction other than special construction to be described below has the same construction as the construction in the embodiment 1 described above and produces the same effect. In the drawings, the same reference symbols denote the same or corresponding parts.

In FIG. 9 and FIG. 10 showing the construction of the air volume regulating mechanism WM in the embodiment 4 in accordance with this invention, this air volume regulating mechanism WM is constructed of a mechanism that utilizes a principle that a bimetal is bent to regulate a cooling air volume. This mechanism WM is secured to the intake port 7 (see FIG. 1) of the main electric motor MA for a vehicle just as with the mechanisms described in from the embodiment 1 to the embodiment 3.

Partition plates constructed of bimetals 92 are disposed in pairs in the wind channel 7d. Each of the bimetals 92 has one end fixed to the wind channel 7d with bolts 95 and has a moving shaft 93 on its other free end, the moving shaft 93 being able to be moved by the guide of a rail 94. These bimetals pairing up with each other are bent by the ambient temperature to vary the opening area of the air channel in the wind channel 7d to regulate the volume of the cooling air flowing through the air channel in the wind channel 7d for constructing the intake port 7.

When the ambient temperature rises, the pair of bimetals 92 are deformed respectively, whereby their other free ends 92b provided with the moving shafts 93 are moved away from their one ends 92a fixed to the wind channel 7d with the bolts 95 to increase the opening area in the air channel in the wind channel 7b. The moving shafts 93 are moved by the guide of the rails 94. When the ambient temperature falls, the bimetals are deformed respectively to move their other free ends 92b provided with the moving shafts 93 near to their one ends 92a fixed to the wind channel 7d with the bolts 95 to thereby narrow the opening area in the air channel in the wind channel 7b. In this manner, the volume of the cooling air flowing through the air channel in the wind channel 7b can be regulated.

According to the embodiment 4 in accordance with this invention, in the cooling device of the electric motor for a vehicle for taking the cooling air into the main electric motor MA for a vehicle through the intake port 7 (see FIG. 1) according to the rotation of the rotor shaft 4 to which the rotor core 2 disposed opposite to the stator core 1 is secured, there are provided closing members that are formed of the bimetals 92, which are made of material deformed according to a change in the ambient temperature and are disposed in a manner protruding into the air channel in the wind channel 7d constructing the intake port 7 and construct the air volume regulating mechanism WM. The closing members, which are made of the bimetals 92 and construct the air volume regulating mechanism WM, are deformed by the ambient temperature to vary the opening area of the wind channel 7d constructing the intake port 7 to thereby regulate the cooling air volume taken into through the intake port 7. Thus, it is possible to acquire the cooling device of the electric motor for a vehicle that can regulate the cooling air volume taken into through the intake port according to the ambient temperature by the closing members formed of the material deformed according to a change in the ambient temperature and protruded into the intake port, thereby being able to effectively reduce the load of the electric motor and the occurrence of noises according to the ambient temperature.

Embodiment 5

Slit Type Air Volume Regulating Mechanism

An embodiment 3 in accordance with this invention will be described with reference to FIG. 11 to FIG. 13. FIG. 11 is a perspective view showing the construction, when viewed from the front side, of an air volume regulating mechanism in the embodiment 5. FIG. 12 is a perspective view showing the construction, when viewed from the rear side, of the air volume regulating mechanism in the embodiment 5. FIG. 13 is a perspective view, partially in cross section, of the construction of the air volume regulating mechanism in the embodiment 5.

In this embodiment 5, construction other than special construction to be described below has the same construction as the construction in the embodiment 1 described above and produces the same effect. In the drawings, the same reference symbols denote the same or corresponding parts.

In FIG. 11 to FIG. 13 showing the construction of the air volume regulating mechanism WM in the embodiment 5 in accordance with this invention, this air volume regulating mechanism WM is constructed of a mechanism for regulating the cooling air volume by slits and this mechanism is secured to the intake port 7 (see FIG. 1) of the main electric motor MA for a vehicle just as with the mechanisms described in the embodiment 1 to the embodiment 4.

This air volume regulating mechanism WM is a mechanism for regulating the volume of the cooling air flowing through the air channel in the wind channel 7e constructing the intake port 7 by varying the opening areas of slits 7S secured to the wind channel 7e by a partition plate 112 rotating around the axis of a bearing 114 by the use of a driving force produced by a bimetal 113 deformed by the ambient temperature.

A circular disk-shaped partition plate 112 has slits 2S opposite to the slits 7S of the wind channel 7e. The opening areas of the slits 7S formed in the wind channel 7e are varied by varying the relative positions between the slits 2S and the slits 7S by rotating the partition plate 112.

When the ambient temperature rises, the partition plate 112 is rotated counterclockwise from the state shown in the drawing by the deformation of the bimetal 113 to thereby increase the opening areas of the slits 7S. When the ambient temperature falls, the partition plate 112 is rotated clockwise from the state shown in the drawing by the deformation of the bimetal 113 to thereby decrease the opening areas of the slits 7S.

In this regard, a range in which the partition plate 112 is rotated is within a range from a state where all of the slits 7S are covered by the partition plate 112 to a state where all of the slits 7S are fully opened. Rotation preventing protrusions 115 are disposed so as to prevent the partition plate 112 from being further rotated, thereby regulating the range in which the partition plate 112 is rotated.

For example, in the case where this air volume regulating mechanism is used in a place where the ambient temperature varies within a large temperature range between a high temperature and a low temperature, when the ambient temperature is high, the bimetal 113 is deformed to automatically open opening portions to bring about a state where a large volume of cooling air can be taken into, and when the ambient temperature is low and hence a small volume of cooling air is required, the opening portions are automatically closed. In this manner, the air volume regulating mechanism WM can regulate the volume of the cooling air to an optimal air volume automatically according to the condition of the ambient temperature.

Further, at the same time, when the air volume regulating mechanism WM is equipped, the air volume regulating mechanism WM can minimize the diffusion of sounds, which are produced when the cooling fan and the conductor parts in the electric motor cut through the wind, and electromagnetically produced noises to the outside of the electric motor, which in turn can reduce noises.

According to the embodiment 5 in accordance with this invention, in the cooling device of the electric motor for a vehicle that takes the cooling air into the main electric motor MA for a vehicle through the intake port 7 (see FIG. 1) according to the rotation of the rotor shaft 4 to which the rotor core 2 disposed opposite to the stator core 1 is secured, there is provided a circular disk-shaped closing member made of the partition plate 112, which is rotatably disposed in a plane crossing the cooling air taken into from the air channel in the wind channel 7e constructing the intake port 7 and has cooling air flowing portions formed of the slits 2S, and there is provided the air volume regulating mechanism WM that is deformed by the ambient temperature to drive the circular disk-shaped closing member made of the partition plate 112, which has the cooling air flowing portions formed of the slits 2S, in such a way as to change the position, to which the circular disk-shaped closing member is rotated, to vary the opening area of the wind channel 7e constructing the intake port 7, thereby regulating the volume of the cooling air taken into through the intake port 7. Thus, it is possible to acquire the cooling device of the electric motor for a vehicle in which the air volume regulating mechanism changes the position to which the circular disk-shaped closing member having the cooling air flowing portions is rotated to regulate the volume of the cooling air taken into through the intake port 7 according to the ambient temperature, thereby being able to efficiently reduce the load of the electric motor and the occurrence of noises according to the ambient temperature.

In the embodiments in accordance with this invention, the constructions shown in the following items from A1 to A5 are proposed.

(A1) The cooling air volume regulating mechanism characterized by including: the electric motor frame for covering the electric motor that has the rotor shaft, the rotor core, and the stator core disposed therein; the intake port that is formed in the one end of the electric motor frame and takes the cooling air into the electric motor; and the bracket that is supported by the other end of the electric motor frame, and characterized in that in the intake port formed in this bracket, the intake port is opened or closed by the choke mechanism using the alloy bimetal deformed by the ambient temperature to thereby regulate the cooling air taken into the electric motor.

(A2) The cooling air volume regulating mechanism characterized in that the intake port through which the cooling air is taken into is opened or closed by the sliding type closing plate using the alloy bimetal deformed by the ambient temperature to thereby regulate the cooling air volume.

(A3) The cooling air volume regulating mechanism characterized in that the intake port through which the cooling air is taken into is opened or closed by the closing plate, which uses the alloy bimetal deformed by the ambient temperature and opens or closes in the blind mode, to thereby regulate the cooling air volume.

(A4) The cooling air volume regulating mechanism characterized in that the alloy bimetal deformed by the ambient temperature is disposed in the intake port, through which the cooling air is taken into, and characterized in that the alloy bimetal is extended or contracted to open or close the intake port to thereby regulate the cooling air volume.

(A5) The cooling air volume regulating mechanism characterized in that the alloy bimetal deformed by the ambient temperature is disposed in the intake port, through which the cooling air is taken into, and characterized in that the closing plate rotated by the driving force produced by the extension or contraction of the bimetal opens or closes the slits disposed in the intake port to thereby regulate the cooling air volume.

Figure 1:
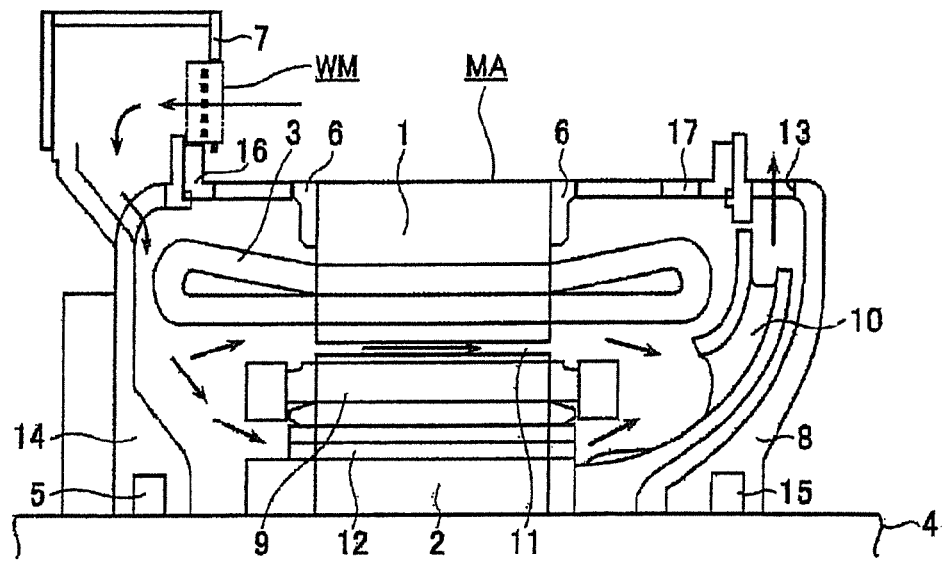
FIG. 1 is a longitudinal sectional view showing an entire construction in an embodiment 1 in accordance with this invention.
Figure 2:
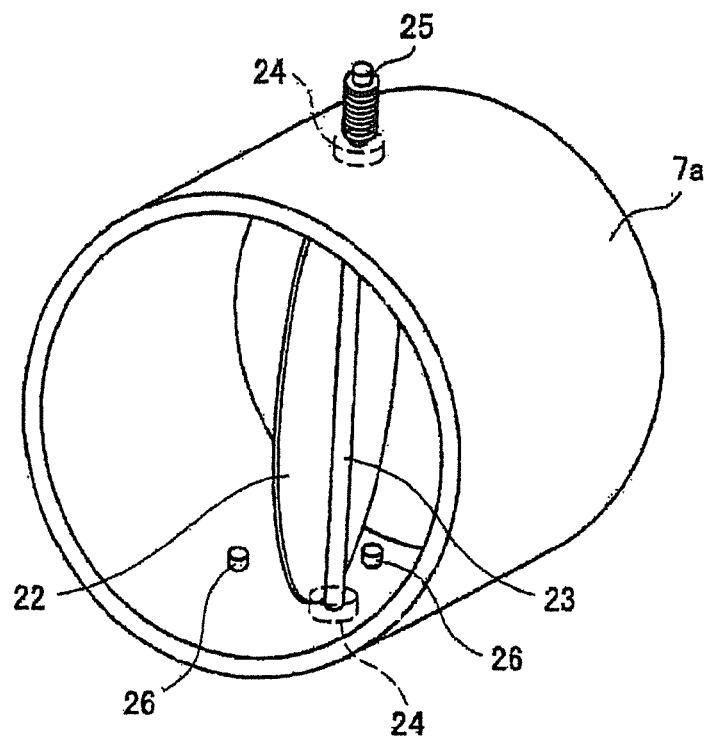
FIG. 2 is a perspective view showing the construction of an air volume regulating mechanism in the embodiment 1 in accordance with this invention.
Figure 3:
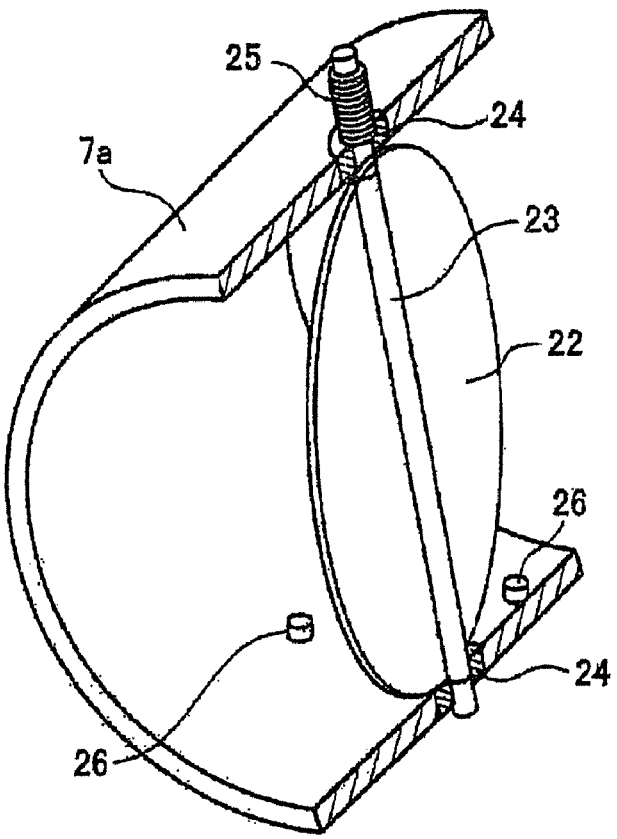
FIG. 3 is a perspective view, partly in cross section, of the construction of the air volume regulating mechanism in the embodiment 1 in accordance with this invention.
Figure 4:
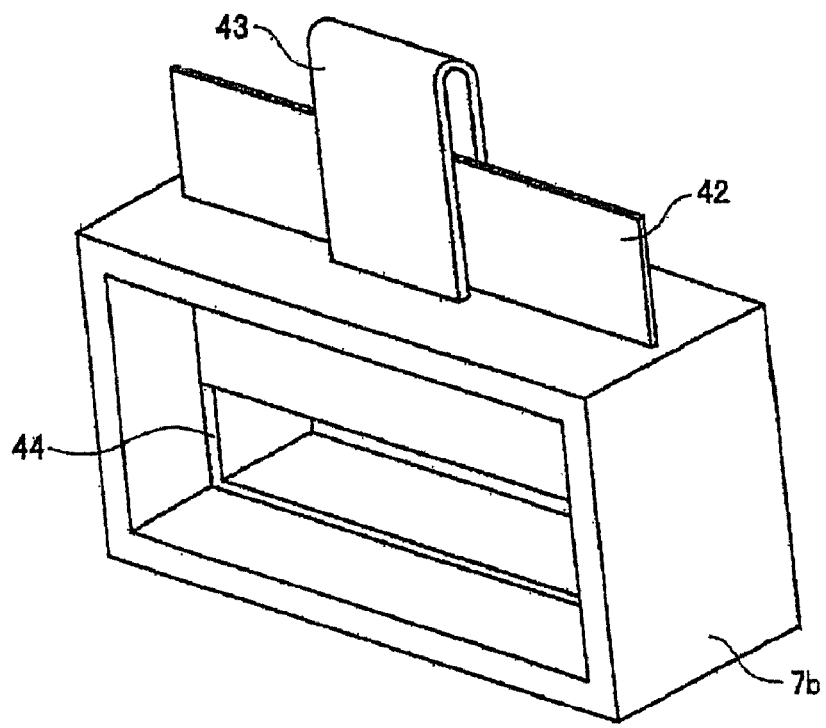
FIG. 4 is a perspective view showing the construction of an air volume regulating mechanism in an embodiment 2 in accordance with this invention.
Figure 5:
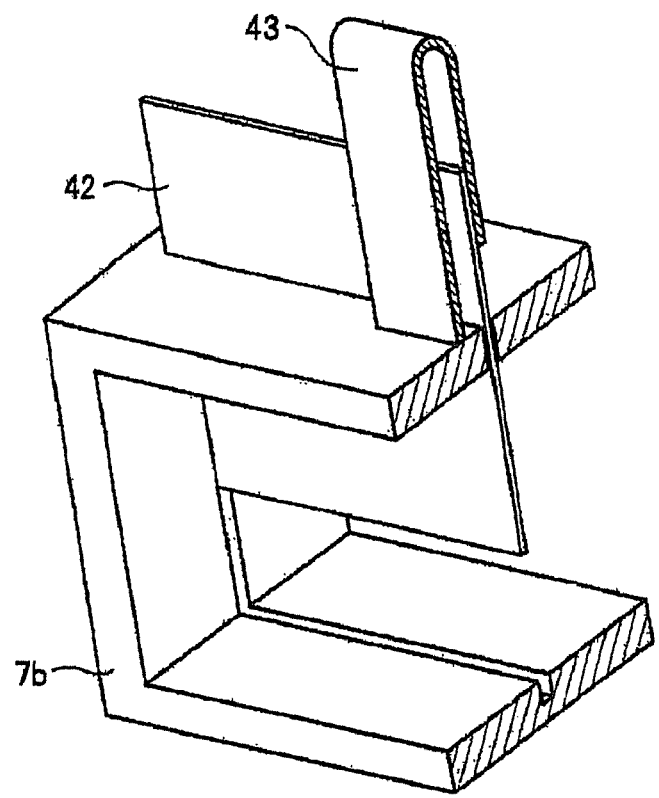
FIG. 5 is a perspective view, partly in cross section, of the construction of the air volume regulating mechanism in the embodiment 2 in accordance with this invention.
Figure 6:
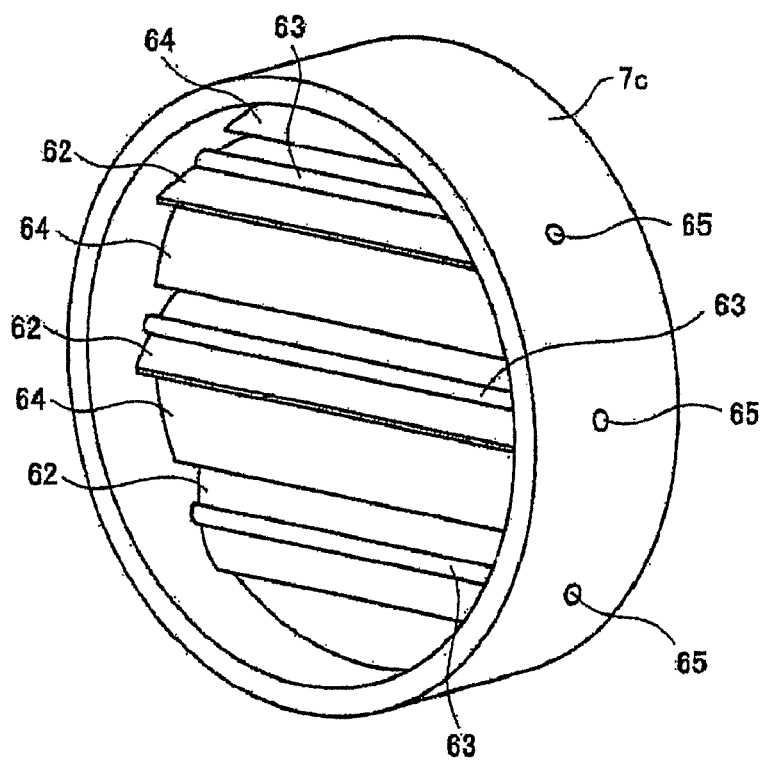
FIG. 6 is a perspective view of the construction, when viewed from a front side, of an air volume regulating mechanism in an embodiment 3 in accordance with this invention.
Figure 7:
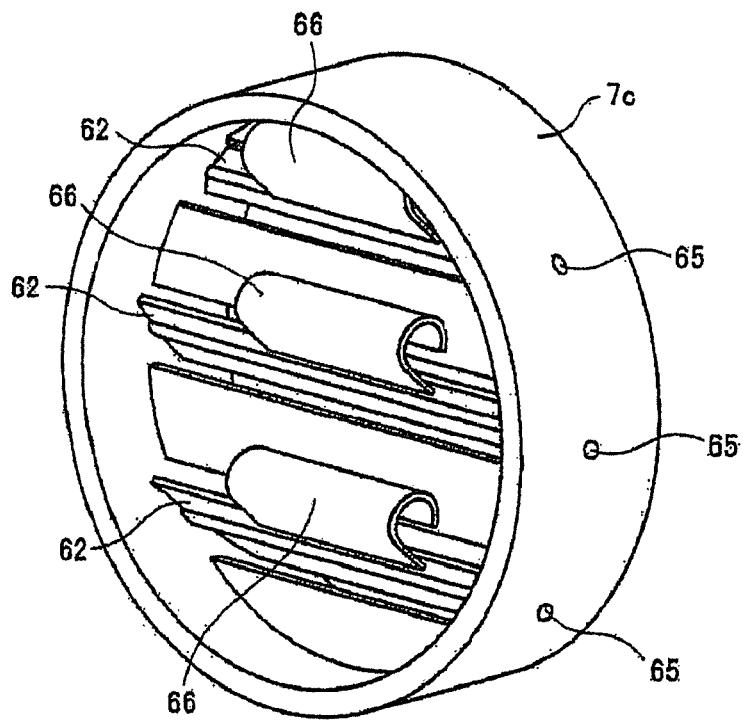
FIG. 7 is a perspective view of the construction, when viewed from a rear side, of an air volume regulating mechanism in the embodiment 3 in accordance with this invention.
Figure 8:
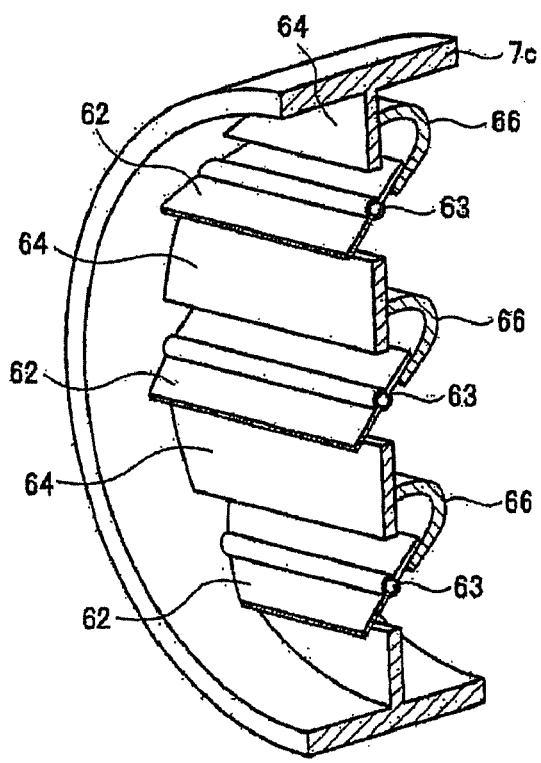
FIG. 8 is a perspective view, partly in cross section, of the construction of the air volume regulating mechanism in the embodiment 3 in accordance with this invention.
Figure 9:
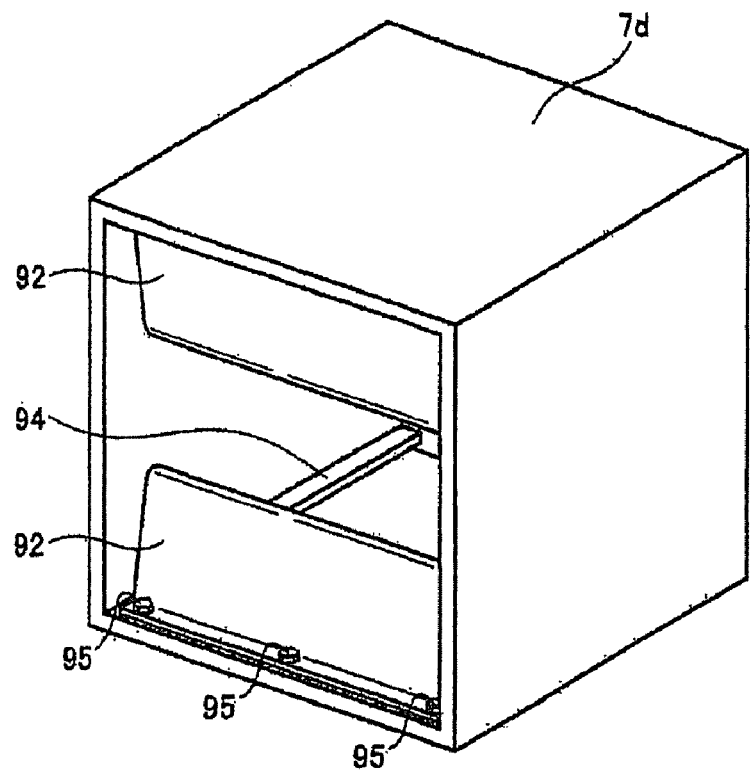
FIG. 9 is a perspective view showing the construction of an air volume regulating mechanism in an embodiment 4 in accordance with this invention.
Figure 10:
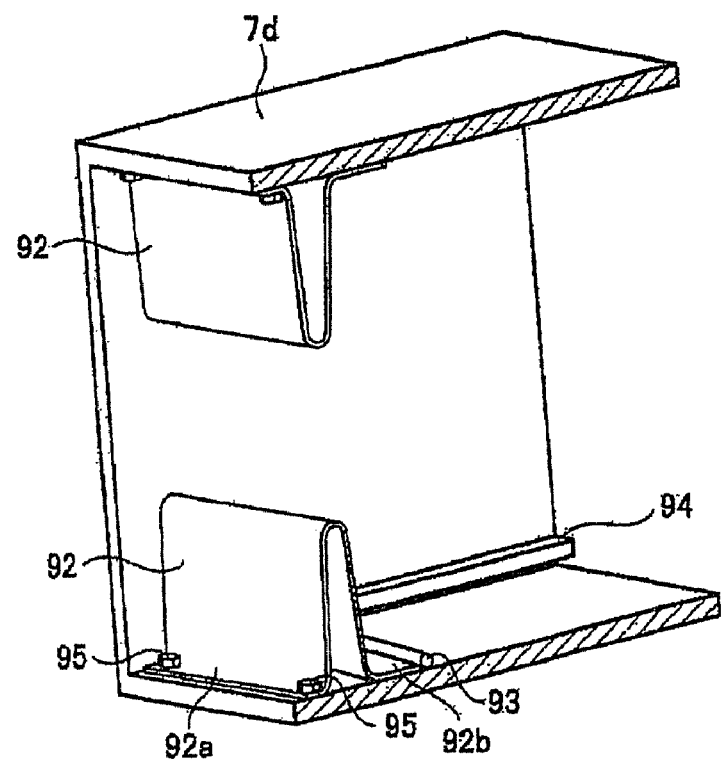
FIG. 10 is a perspective view, partly in cross section, of the construction of the air volume regulating mechanism in the embodiment 4 in accordance with this invention.
Figure 11:
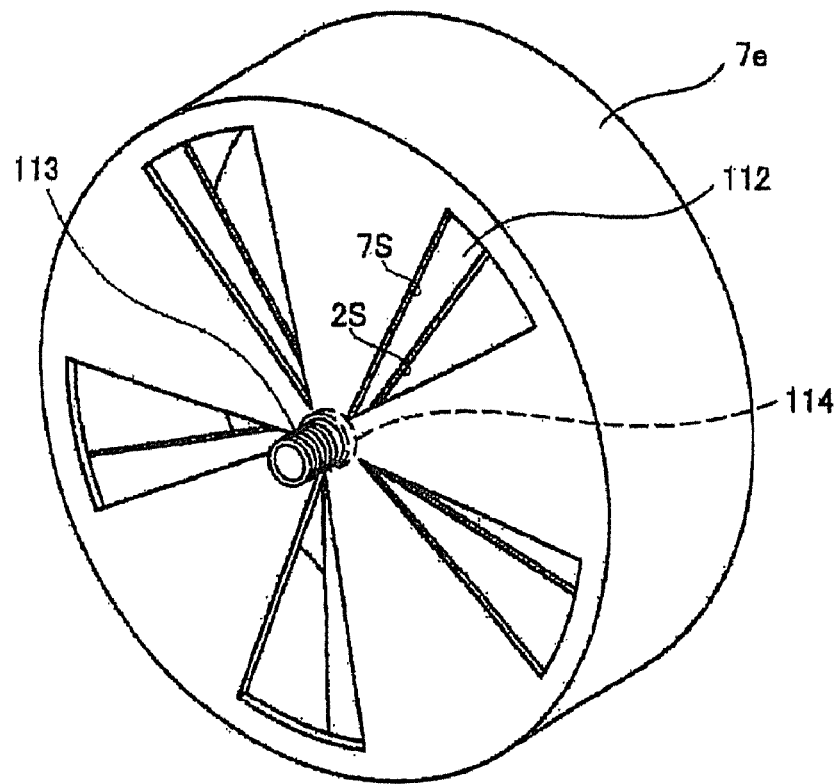
FIG. 11 is a perspective view of the construction, when viewed from a front side, of an air volume regulating mechanism in an embodiment 5 in accordance with this invention.
Figure 12:
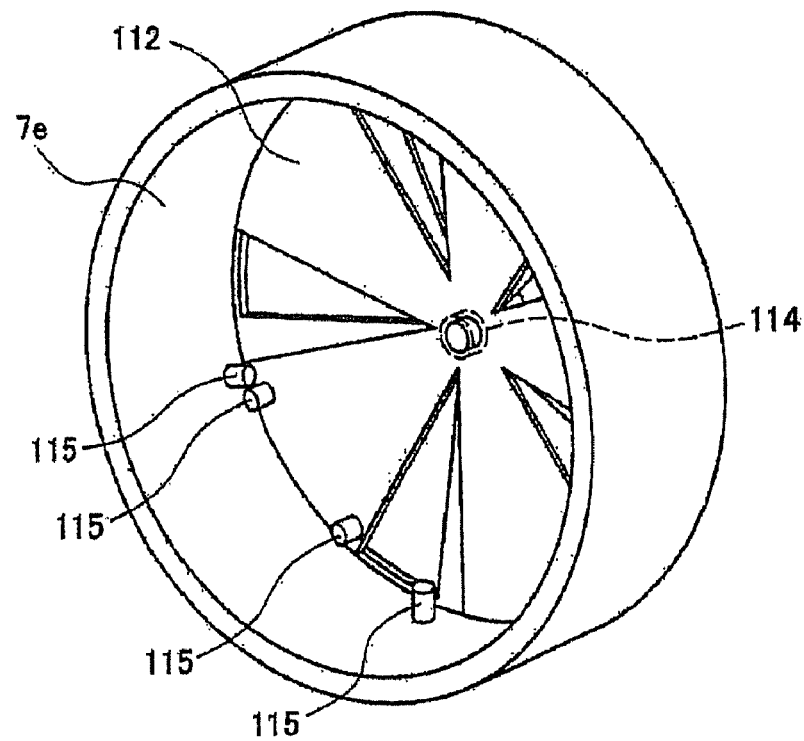
FIG. 12 is a perspective view of the construction, when viewed from a rear side, of an air volume regulating mechanism in the embodiment 5 in accordance with this invention.
Figure 13:
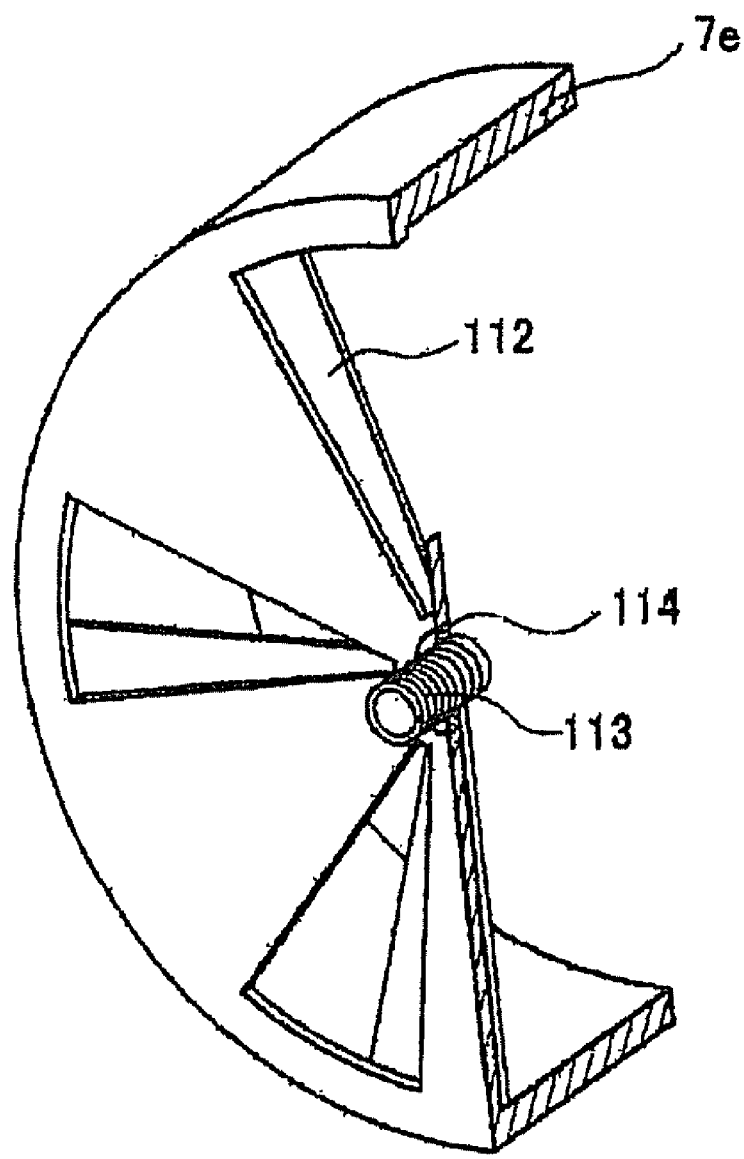
FIG. 13 is a perspective view, partly in cross section, of the construction of the air volume regulating mechanism in the embodiment 5 in accordance with this invention.

DESCRIPTION OF THE REFERENCE SYMBOLS 1 stator core
2 rotor core
3 stator coil
4 rotor shaft
5 bearing
6 frame
7 intake port
7a, 7b, 7c, 7d, 7e wind channel
8 drive side bracket
9 rotor conductor
10 fan
11 gap
12 air opening
13 exhaust opening
14 anti-driving side bracket
15 bearing
16 frame
22 partition plate
23 rotary shaft
24 bearing
25 bimetal
26 stopper
42 partition plate
43 bimetal
44 groove
62 partition plate
63 rotary shaft
64 stopper
65 bearing
66 bimetal
92 bimetal forming partition plate
93 moving shaft
94 rail
95 bolt

112 partition plate
113 bimetal
114 bearing
115 rotation preventing protrusion

The invention claimed is:

1. A cooling device of an electric motor for a vehicle, in which cooling air is taken into the electric motor through an intake port according to rotation of a rotor shaft to which a rotor core disposed opposite to a stator core is fixed, comprising:
- an air volume regulating mechanism for regulating a cooling air volume taken in through the intake port according to an ambient temperature and provided in the intake port and located outside of the electric motor for the vehicle,
- the air volume regulating mechanism including a cylindrical channel forming an air channel and a partition plate for varying an opening area of the air channel according to deformation of a bimetal which is deformed according to an ambient temperature in surroundings where the electric motor for the vehicle is disposed, and
- the opening area of the air channel being narrowed by the partition plate according to deformation of the bimetal when the ambient temperature falls.

2. The cooling device of an electric motor for a vehicle according to claim 1, wherein the air volume regulating mechanism partition plate changes an arrangement angle with respect to a direction of flow of the cooling air taken into through the intake port, and the bimetal is deformed by the ambient temperature to drive the partition plate to thereby change an opening area of the intake port, thereby regulating the cooling air volume taken into through the intake port.

3. The cooling device of an electric motor for a vehicle according to claim 1, wherein the partition plate is disposed movably in a direction of extension and opening/closing the intake port, and is deformed by the ambient temperature to move the partition plate in the direction of extension to thereby change the opening area of the intake port, thereby regulating the cooling air volume taken into through the intake port.

4. The cooling device of an electric motor for a vehicle according to claim 1, wherein the air volume regulating mechanism is provided with a plurality partition plates, for changing an arrangement angle with respect to a direction of flow of the cooling air taken in through the intake port, the plurality of partition plates, being disposed in parallel to an air channel of the intake port, and the bimetal is deformed by the ambient temperature to drive the plurality of partition plates, to thereby change the opening area of the intake port, thereby regulating the cooling air volume taken into through the intake port.

5. The cooling device of an electric motor for a vehicle according to claim 1, wherein the partition plate is a circular disk-shaped closing member having a cooling air flowing portion disposed turnably in a plane crossing the cooling air taken into through the intake port and the bimetal is deformed by the ambient temperature to drive the circular disk-shaped closing member in such a way as to change a position to which the circular disk-shaped closing member is turned to thereby change the opening area of the intake port, thereby regulating the cooling air volume taken into through the intake port.

* * * * *